(12) United States Patent
Siegel (10) Patent No.: US 10,255,256 B2
(45) Date of Patent: *Apr. 9, 2019

(54) COMPUTERIZED METHOD AND COMPUTER PROGRAM FOR DISPLAYING AND PRINTING MARKUP

(71) Applicant: Gary Siegel, Miami, FL (US)

(72) Inventor: Gary Siegel, Miami, FL (US)

(73) Assignee: Gary Siegel, Miami, FL (US)

( * ) Notice: Subject to any disclaimer, the term of this patent is extended or adjusted under 35 U.S.C. 154(b) by 454 days.

This patent is subject to a terminal disclaimer.

(21) Appl. No.: 14/190,548

(22) Filed: Feb. 26, 2014

(65) Prior Publication Data
US 2014/0215324 A1  Jul. 31, 2014

Related U.S. Application Data

(63) Continuation-in-part of application No. 12/424,005, filed on Apr. 15, 2009, now Pat. No. 8,700,984.

(51) Int. Cl.
| | |
|---|---|
| G06F 17/00 | (2006.01) |
| G06F 17/24 | (2006.01) |
| G06F 17/21 | (2006.01) |
| G06F 17/22 | (2006.01) |

(52) U.S. Cl.
CPC ............ *G06F 17/24* (2013.01); *G06F 17/211* (2013.01); *G06F 17/2229* (2013.01)

(58) Field of Classification Search
CPC .......................... G06F 17/211; G06F 17/2229
USPC ......................................... 715/230, 231, 232
See application file for complete search history.

(56) References Cited

U.S. PATENT DOCUMENTS

| | | | | |
|---|---|---|---|---|
| 6,567,830 B1 * | 5/2003 | Madduri | ............... | G06F 17/241 715/235 |
| 8,510,649 B2 * | 8/2013 | Isidore | ................... | G06F 9/543 715/255 |
| 8,838,557 B2 * | 9/2014 | Bhogal | ............. | G06F 17/30067 707/695 |
| 2003/0214528 A1 * | 11/2003 | Pierce | ................... | G06F 17/241 715/723 |

OTHER PUBLICATIONS

Microsoft Word 2007 to Word 2016 Tutorials: Document Collaboration, 2010, homeandlearn.co.uk, pp. 1-4.*
Ted Padova, Adobe Acrobat 8 PDF Bible, 2007, Wiley Publishing, pp. 545-548 and 551-552.*
Minal Agarwal, 'How to Track and Review Changes in Microsoft Word 2007', published Aug. 16, 2008.*

\* cited by examiner

*Primary Examiner* — Stephen S Hong
*Assistant Examiner* — Matthew J Ludwig
(74) *Attorney, Agent, or Firm* — Cesarano Law, LLC; Patrick C. Cesarano (57) ABSTRACT

Aspects of this disclosure relate to a process whereby markup text and/or graphics may be overlaid on top of an original document such that a user may view both the original document and the overlaid text and graphics together in an unobtrusive manner. Some aspects further discuss broader markup functionalities, such as modifying the content or appearance of text and graphics when a mark-up function is performed.

48 Claims, 8 Drawing Sheets

PURCHASE AGREEMENT

This Agreement is made and entered into this _____ day of __________________,
__________, by and between ABC Corporation ("Seller") and XYZ, Inc. ("Buyer").

For and in consideration of $10.00 and other good and valuable consideration, the parties agree as follows:

SECTION 1.01: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by ~~each and~~ every term of this agreement. By signing below, the parties consent to enforcement of this agreement.

SECTION 1.02: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.03: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.04: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement.

Fig. 3

PURCHASE AGREEMENT

This Agreement is made and entered into this _____ day of ______________________, ____________, by and between ABC Corporation ("Seller") and XYZ, Inc. ("Buyer").

For and in consideration of $10.00 and other good and valuable consideration, the parties agree as follows:

SECTION 1.01: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.02: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.03: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

Fig. 4

PURCHASE AGREEMENT

This Agreement is made and entered into this _____ day of _____________________, ____________, by and between ABC Corporation ("Seller") and XYZ, Inc. ("Buyer").

For and in consideration of $10.00 and other good and valuable consideration, the parties agree as follows:

SECTION 1.01: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.02: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.03: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

Fig. 5

PURCHASE AGREEMENT

This Agreement is made and entered into this _____ day of __________________,
__________, by and between ABC Corporation ("Seller") and XYZ, Inc. ("Buyer").

For and in consideration of $10.00 and other good and valuable consideration, the parties agree as follows:

SECTION 1.01: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.02: These are the provisions of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.03: These are the provisions of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.04: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

Fig. 6

PURCHASE AGREEMENT

This Agreement is made and entered into this ____ day of __________________, __________, by and between ABC Corporation ("Seller") and XYZ, Inc. ("Buyer").

For and in consideration of $10.00 and other good and valuable consideration, the parties agree as follows:

[715] SECTION 1.01: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this ~~agreement~~ The Buyer [705] agrees to buy and the Seller agrees to sell the items described in this document. Here are some more provisions of this agreement. The parties to this agreement [720] will abide by each and every term of this agreement. By signing below, the parties consent to enforcement of this agreement. [710]

SECTION 1.02: These are the provisions of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.03: These are the provisions of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.04: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

COMPUTERIZED METHOD AND COMPUTER PROGRAM FOR DISPLAYING AND PRINTING MARKUP

REFERENCE TO CO-PENDING APPLICATIONS

This application is a Continuation in Part of application Ser. No. 12/424,005 filed Apr. 15, 2009 entitled "COMPUTERIZED METHOD AND COMPUTER PROGRAM FOR DISPLAYING AND PRINTING MARKUP." The disclosure of the prior applications is hereby incorporated by reference herein in its entirety.

Some aspects of application Ser. No. 12/424,005 describe a process whereby text and graphics are overlaid on top of an original document so that a user may view both the original document and the overlaid text and graphics. This continuation in part describes, among other things, further methods in which a document may be marked up and altered. For example, in addition to overlaying graphics, text or both over a digitized document, the content or appearance of text and graphics contained in the original document may be altered by some of the methods described in this continuation in part.

DEFINITIONS

"Marked changes" may include graphics or text added to or overlaid onto a document, a change in the font attributes or typeface of text contained in the document, a change in the text, formatting or layout of text or graphics of the original document, or any combination of the foregoing. Marked changes may include a reference graphic.

"Strikethrough element" describes a line or other graphic that appears over or as part of a text character or space when a strikethrough font attribute is applied to the text or space; it may appear approximately in the vertical mid-point of the text character or space; it is intended to reflect that the text and spaces are stricken.

A "change location" is a place defined by a user on an original document where marked changes may be made, overlaid or applied. "Change location" may also be referred to as "selected region".

"Selected text" describes the text that is contained within a selected region.

"Modified change location describes the portion of the original document between the start and end point of the change location, after change location is modified by the methods described herein.

"White space non-text graphic" describes a graphic that does not contain user-inputted text that is to be located in the white space of a document, such as in the margins, between blocks or lines of text in the original document, or generally referring to any portion of the document not obscuring original text or graphics. The white space non-text graphic may be located within a white space and generally does not cross text in the original document. The white space non-text graphic may contain text that was not user-inputted, wherein the text is part of the graphic.

"White space element" refers to either a white space graphic or a white space non-text graphic.

"Connection graphic" describes a graphic that indicates a relationship or connection between a reference graphic and the white space graphic such as a series of intersecting line segments that extend from the reference graphic to the white space graphic. Unless modified by a preference setting or user input, a connection graphic may usually be located within white space and not cross text in the original document.

"Formatting change" refers to a change to a document other than either a change to text content or font attribute change; "Formatting change" includes, without limitation, changes to indention, margins, line spacing, character spacing and tabs.

BRIEF DESCRIPTION OF THE DRAWINGS

FIG. 3 demonstrates some aspects of markup discussed herein and illustrates further visual outcomes of said markups including strike-out markup;

FIG. 7 demonstrates some further aspects of markup discussed herein and illustrative possible visual outcomes of said markups.

DETAILED DESCRIPTION OF SOME PREFERRED EMBODIMENTS

Functionality

A) In cases where the selected region contains one or more characters of text, the following may apply:

A reference graphic may be generated at the selected region without changing the original document, or a change may be made to the original document or both.

Types of changes to the original document may include font attribute changes, changes in text, changes in document formatting or layout, other document changes or any combination of the foregoing.

A font attribute can be an item of data that is related to text and indicates that the related text should be displayed, printed or associated with a specific appearance. Font attributes that may be modified include, but are not limited to, strikeout/strikethrough (the terms strikeout and strikethrough are used interchangeably here), underline, double-underline, bold, italic, foreground color, background color, highlight, subscript, superscript, uppercase, lowercase, small caps, initial caps, typeface, font weight, font family, font size, etc. A modification to font attributes may include adding a new attribute (such as the addition of a strikethrough attribute), changing an existing attribute (for example, changing from underline to strikethrough) or simply eliminating an existing font attribute. There are various ways to modify font attributes that are well-recognized by those skilled in the art to which this invention belongs. One such way is to store font attribute codes within a digitized document that indicate the start and end of text to which a particular font attribute applies. For example, there could be a "strikeout on" code associated with the position of a character of text and also a "strikeout off code" associated with the position of another character of text that appears later in the document. Together, those codes may indicate that text between the codes should display and print with strikeout.

Some font attribute changes, such as strikethrough, will generally change only the appearance of selected text without materially changing the selected text's position in the document and without changing any other document formatting or the flow of other text or graphics in the document. Other font attribute changes, text changes, formatting and layout changes and other changes may change the flow of text and graphics in the document.

Figure 8:
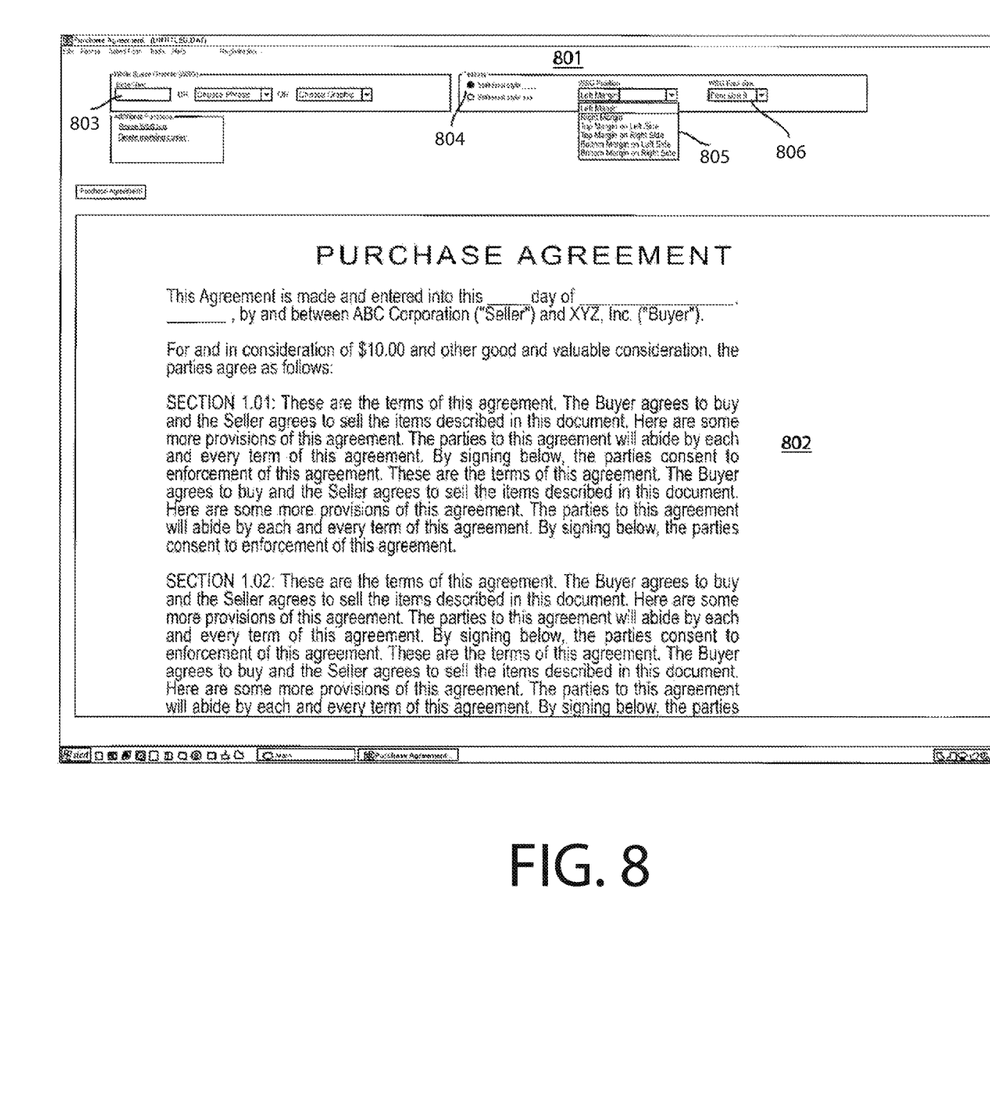
FIG. 8 illustrates a computing device capable of performing the methods described herein.

FIG. 8, for example, depicts a screen shot 801 of how various settings and inputs may result in a variety of differing document 802 markup appearances, culminating in a unique markup tailored to any given user. It is to be noted that the illustration of FIG. 8 is merely one way to organize the various settings and any other arrangement of input boxes, buttons, dropdown boxes, radio buttons, or any other form of input in furtherance of determining a White Space Graphic (WSG) and a variety of options to apply to the WSG. Box 803 may have any number of other variations in selecting the base WSG than are illustrated here, and is not particularly limited as to any manner of field content, grouping, or displaying WSG parameters for user selection, etc.

In the embodiment of FIG. 8, the leftmost box 803 represents the WSG selection options. Box 803 may have one of three available options: (1) a user defined text box input (e.g., initials such as "RNL"), (2) a predetermined phrase or expression dropdown box containing pre-stored phrases (e.g., "To Be Determined"), and (3) a predetermined graphic drop down box (e.g., "☺"). Whichever selection the user makes can be used to determine which WSG to use during the markup process of document 802. If no WSG is selected, a default WSG will be used during markup.

The rightmost box 804 contains some WSG display options that may be applied in conjunction with whichever baseline WSG the user has selected from box 803. As depicted in FIG. 8, the options box 804 is illustrated as having a radio button option for determining whether the strikeout style is to appear under the text (_ _ _ _ _) or on the text (xxxxx). There may also be many other WSG display options available. Next to box 804 is a WSG position drop-down box 805. Drop down box 805 can be used to select whether the WSG appears in the left or right margins, or in the bottom or top of the left or right white space margins of the document 802. Finally, box 804 depicts a font box 806 that determines the font size of the tailored WSG. Although box 804 only depicts three option fields, many more fields (such as foreground color, background color, or even opacity, etc.) may be provided without exception without departing from the scope of the methods described herein.

When a change location is determined from user input, such as by specifying the start and end points of a location in a document via a mouse click or mouse drag or touch gesture, various preferences may determine whether to add a reference graphic to the original document, or make a change to the original document or both. The type of reference graphic or document change (including font attribute changes) or the type and appearance of the connection graphic may be determined by other preferences.

When a preference specifies that the font attributes of selected text are to be changed, another preference can determine which font attributes are to be applied or changed; in that case, by default, a strikethrough font attribute may be applied. When font attributes are to be changed, by default there will be no reference graphic. In that case, by default, the connection graphic can connect the strikethrough element of the selected text, or a point near the strikethrough element, to the white space element.

The preferences may initially be determined by default settings that do not require any user input. Generally users may change a default preference by performing an additional user-input step. For example, a mouse-click or finger press on a displayed toolbar or button may specify that a bold font attribute is to be added to the selected text instead of the default strikethrough font attribute.

Generally, the default preferences could specify that, for example, no reference graphic will be generated, a strikethrough font attribute will be applied to the selected text, a white space element will be generated (which includes user-inputted text, if entered) and a connection graphic will connect the selected text to a white space graphic. The resulting visual appearance may be very similar to single line strikeout and adjacent line strikeout; the main difference being that instead of a strikeout line being overlaid on top of the selected text, a strikethrough font attribute may be applied to the selected text.

A preference may also be used to determine that a specific type of reference graphic is to be used when font attributes are also changed; for example, the reference graphic could contain a border surrounding the selected text, or a border combined with a caret. Any combination of reference graphic and font attribute change may specified by preferences.

Preferences may also specify how the connection graphic connects with the reference graphic or selected text, depending upon the nature of the reference graphic or selected text. For example, the connection graphic could touch the strikeout element of the selected text, an edge of a character of the selected text or the edge of a reference graphic such as a border, the top edge of a caret, etc., or the connection graphic could start at or be placed near enough to the selected text or reference graphic to provide a visual connection to the selected text or reference graphic as the case may be. Where the connection graphic is to touch an edge of a character of the selected text, a preference may specify which point of the text the connection graphic connects to. For example, where a character, word or contiguous words are selected, the connection point could be the point of the text characters that is closest to one margin or another, as further specified in the preferences, or closest to the margin where a white space element may appear. Where both changing a font attribute of selected text and also generation of a reference graphic at the selected region are required, a preference may determine the connection point and whether the connection is made to the selected text or the reference graphic, the default preference usually being a connection to the reference graphic, although preferences may be readily changed.

One item of user input can define the change location on the digitized document. The user may also input text to include in the white space element; otherwise a default white space element may be used. The user may also input text to replace the text in the change location, but otherwise a default preference may determine what change to the document will be made at the change location or the type of reference graphic to be generated at the change location, or both.

The following demonstrates some effects of various preferences after the user defines the change location.

1) Using the default preferences, which might specify that a change of font attributes and not a reference graphic should be used at the selected region, a strikethrough font attribute may be added to the selected text, a white space element may be added to the document and a connection graphic may be generated between the selected text and the white space element.

2) When the preferences specify that a reference graphic should be generated at the selected region and not a change in font attributes, the reference graphic may be generated at the selected region, a white space element may be added to the document and a connection graphic may be generated between the reference graphic and the white space element;

3) When the preferences specify that both a reference graphic and also a change of font attributes should be used at the selected region, a strikethrough font attribute may be added to the selected text, a reference graphic may be generated at the region, a white space element may be added to the document and a connection graphic may be generated between the white space element and the reference graphic.

If the user had also inputted an item of text, a preference can determine whether the inputted text will be included in the white space element or will replace the original text in the change location. By default, generally the first item of text inputted by the user may be contained in the white space element.

A preference could instead determine that the first item of user-inputted text should replace the original characters of the selected text; in that case the white space element might be a default white space non-text graphic, the selected text in the change location could be replaced by the user-inputted text and a connection graphic could connect the new text in the document to the white non-text graphic.

The user may alternatively input two items of text in addition to defining the change location; in that event one of the items of text may be contained in the white space element and the other may replace the original text at the change location.

A preference may determine that a formatting change should be made at the change location. An example of a formatting change may be comprised of indenting a paragraph. If a formatting change is made, a white space element could be generated and a connection graphic could connect the formatting change to the white space element.

Some marked changes may be completed using no more than one user-input step. For example, a user may want to strike through text, add a default white space non-text graphic, and also add a connection graphic connecting the two. This process may be completed using no more than one user input step: defining the change location on the digitized document. Once the change location is defined, a connection graphic and a white space non-text graphic could be automatically generated.

B) The program may accept additional user input that sets or overrides preferences, such as preferences for the reference graphic to be used, the type of reference graphic to be used, or the type of font attribute or other change to be made or the desired function or a combination of the foregoing. For example, the user may click on a displayed toolbar button or menu item signifying that the desired function is to add a bold font attribute to selected text instead of the default strikethrough attribute; or the user could click a toolbar button to require that a specific type of reference graphic be used. For example, an oval may be chosen by the user instead of a rectangle to surround text, or a caret, arrow or dot could be chosen from a toolbar button for use as the point type reference graphic when the user identifies a location for a reference graphic. An additional option that may be chosen by a user may result in a formatting change, such as indenting text at the change location.

C) An option may be provided wherein the user may both enter text for the white space graphic and, via an additional user input event, select the specific graphic for the white space that is to contain the text D) A point type reference graphic may appear not only between characters or between lines, but could appear anywhere else in the white space of the document. For example, a point type reference graphic could appear just before the beginning of a line of text or just after the end of a line of text, near enough to the first character or last character on the line of text so as to indicate an insertion point.

E) If a preference is chosen that allows a connection graphic to cross text in the document, the connection graphic may be a straight line or other graphic. The connection graphic may have a light fill or translucent color to reduce obscuring of the text of the digitized document instead of with an opaque graphic with black fill. In a preferred embodiment, the default preference, which is used in the examples herein, specifies the location of the connection graphic as being located within white space without crossing text in the document.

F) The white space graphic will generally be placed at a location in the margin that is close to the selected region, while allowing sufficient room to allow a visible connection graphic between the white space graphic and either the reference graphic or the selected text, whichever is applicable. Generally, no part of the white space graphic will be within the selected region. The positioning of the white space graphic may be changed via a preference setting or user input.

G) The marked changes (comprised of an overlay, document change or both) may be incorporated into the original document. Alternatively, the marked changes may be incorporated into a new document in which the markup is combined with the content of the original document, or the marked changes may be stored in a separate computer file or memory space so that the original document may be displayed, printed or transmitted with or without the markup as desired. A description of the marked changes and their location may be stored with the document or separate from the document so that it will be possible to use a typical "undo" feature to reverse any changes. Additionally, a bitmap, vector or other graphical image of the document containing the marked changes may be generated, stored in computer memory, or saved as a computer file (such as a PDF, JPEG, BMP, TIFF or other computer file) which may be later displayed, printed or both, or transmitted by email or other typical method for transferring computer storage files.

Description of Markup Creation Process

The method and computer program generally carries out these tasks as follows. If desired, the user may input text to be included in a white space element. The text is received from input performed by pressing characters on a keyboard or other input method. The user may also use an option to input additional text that will replace existing text in the original document, thus changing the document. User input is completed when the user defines a change location on the digitized document where a reference graphic will be placed, a change is to be made to the document or both. The change location is generally defined by the user's selection of one or two points on the digitized document. The point or points can be chosen using a single mouse click or single mouse drag or touch gesture or by another input device or other method. Choosing two points can indicate the start and end of the change location. In a preferred embodiment, once the change location is defined by the user, a white space element may automatically be generated along with a connection graphic reference graphic; additionally, a reference graphic may be automatically generated at the change location, or a change can be made to the document at the change location, or both.

The text within the change location becomes the selected text. To determine which text is between the two points, a standard text flow can be used. (For the English language, text on a line usually flows from left to right and then onto the next lower line of text, continuing from left to right on each succeeding lower line of text throughout the document.) For example, using the default preferences described herein, FIG. 1, Section 1.03, shows the effect of a strikethrough font attribute being added to the text 130 that was selected by dragging a mouse from the start of the text to be stricken (just before "The parties", which establishes one point) to the end of the stricken text (just after "agreement.", which establishes a second point).

When changing a font attribute, such as by adding a strikethrough font attribute, the attribute may be applied to specific non-space characters; alternatively, a preference may determine that the strikethrough attribute will apply to contiguous text characters and intervening spaces.

Modification of the original content of the document may be made by the user following the addition of markup if allowed by a preference. Such modification could be performed in the manner typically performed in a word processing, text editing or graphic application. Changes to text within the selected region may cause the region to expand or contract; a formatting or font attribute change according to an embodiment could apply to any newly added text within the selected region and any associated reference graphic may be regenerated over the modified region. Changes to the document that visibly appear earlier in the document compared with the selected region may cause the selected region to move along with the reference graphic, if any. When the selected region is modified or moved, the connection graphic can be regenerated so as to connect the changes in the change location to the white space element. The white space element may also be automatically moved so that it is located in white space that is close to the modified change location.

Figure 1:
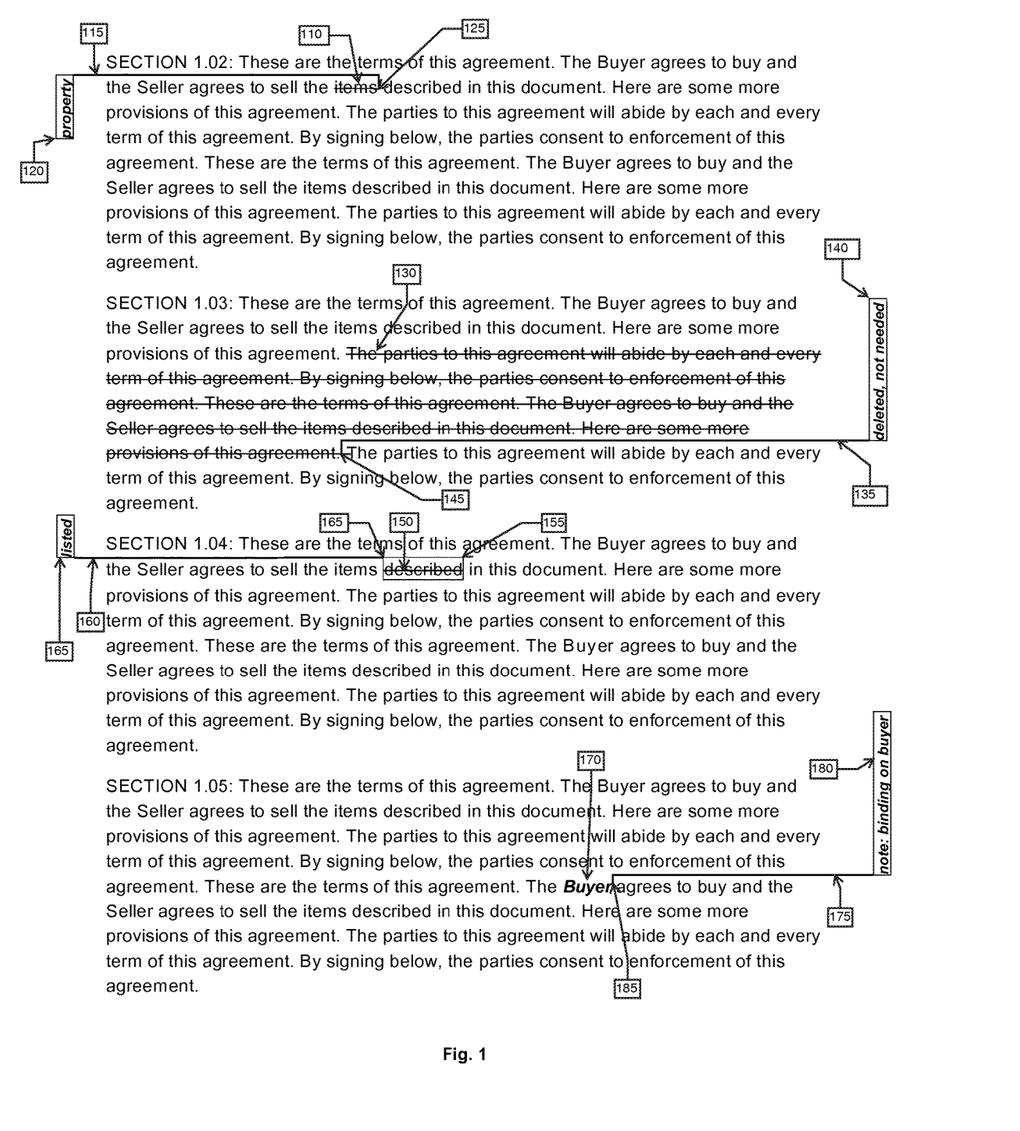
FIG. 1 demonstrates some aspects of markup discussed herein and illustrate possible visual outcomes of said markups such as font changes or illustrative changes.

FIGS. 1 through 7 show the marked changes that are created from a variety of user input using the preferences described herein:

a) Section 1.02 of FIG. 1 shows an example of the markup function "Font Strikeout and Replace". In this example, the preferences specify that a font attribute should be applied to the text in the change location instead of a reference graphic. The markup produced by the function Font Strikeout and Replace consists of: font attribute strikethrough applied to the selected text 110 instead of generating a reference graphic (the selected text is the word "items"); a connection graphic with line segments 115; and white space graphic containing the word "property" 120. For this markup function, the user enters the word "property" to be inserted in the white space graphic over the original document. Then, using the mouse, the user positions the cursor over the first character in the original document to be stricken and replaced and drags the mouse over each text character and space to be stricken and replaced. In this case the user dragged the mouse over each character in the word "items" 110. Section 1.02 of FIG. 1 reflects the result markup elements 110, 115 and 120 of the two user input events: 1) text entry; and 2) selection of text using a mouse.

Figure 2:
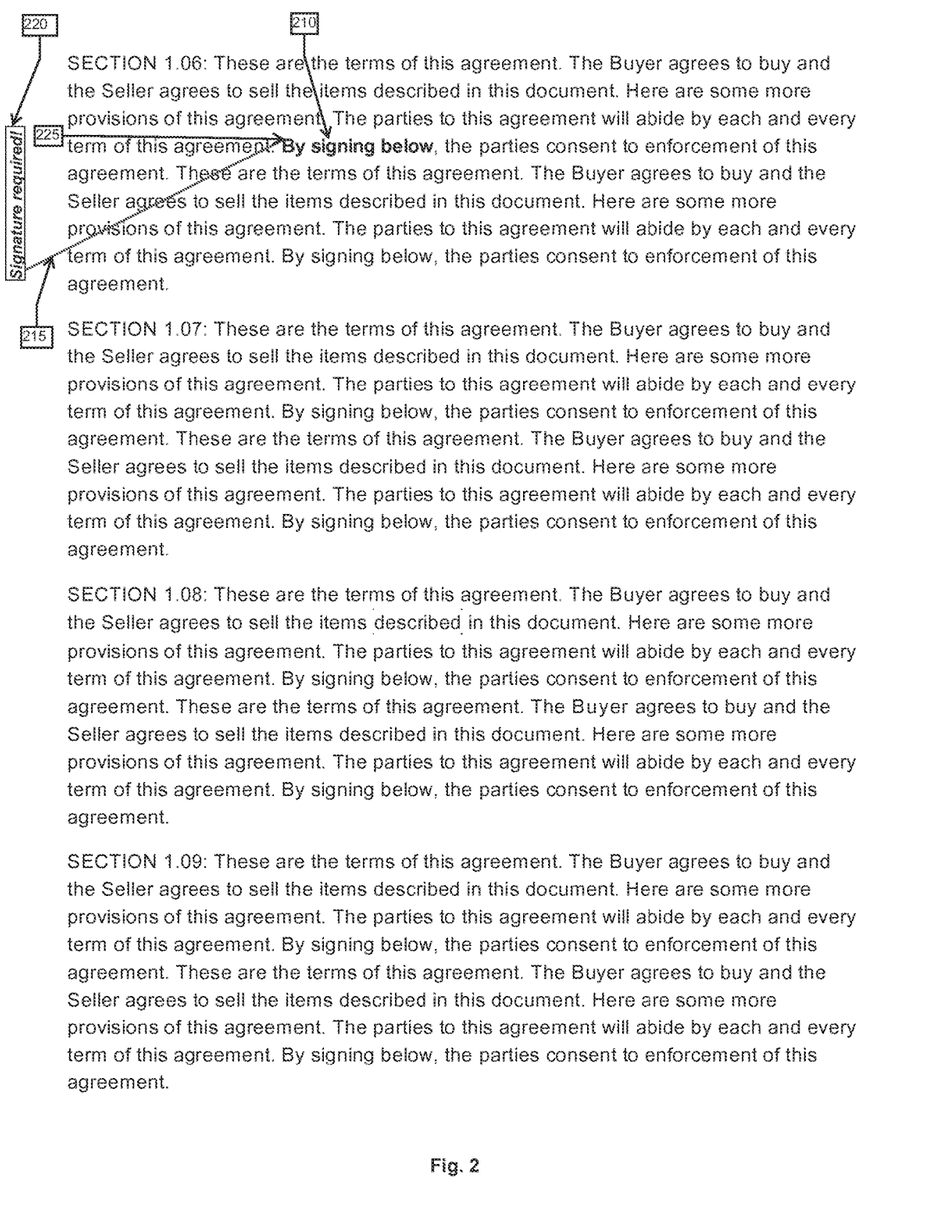
FIG. 2 demonstrates some further aspects of markup discussed herein including color variations to the markup and/connection graphic.
Figure 4:
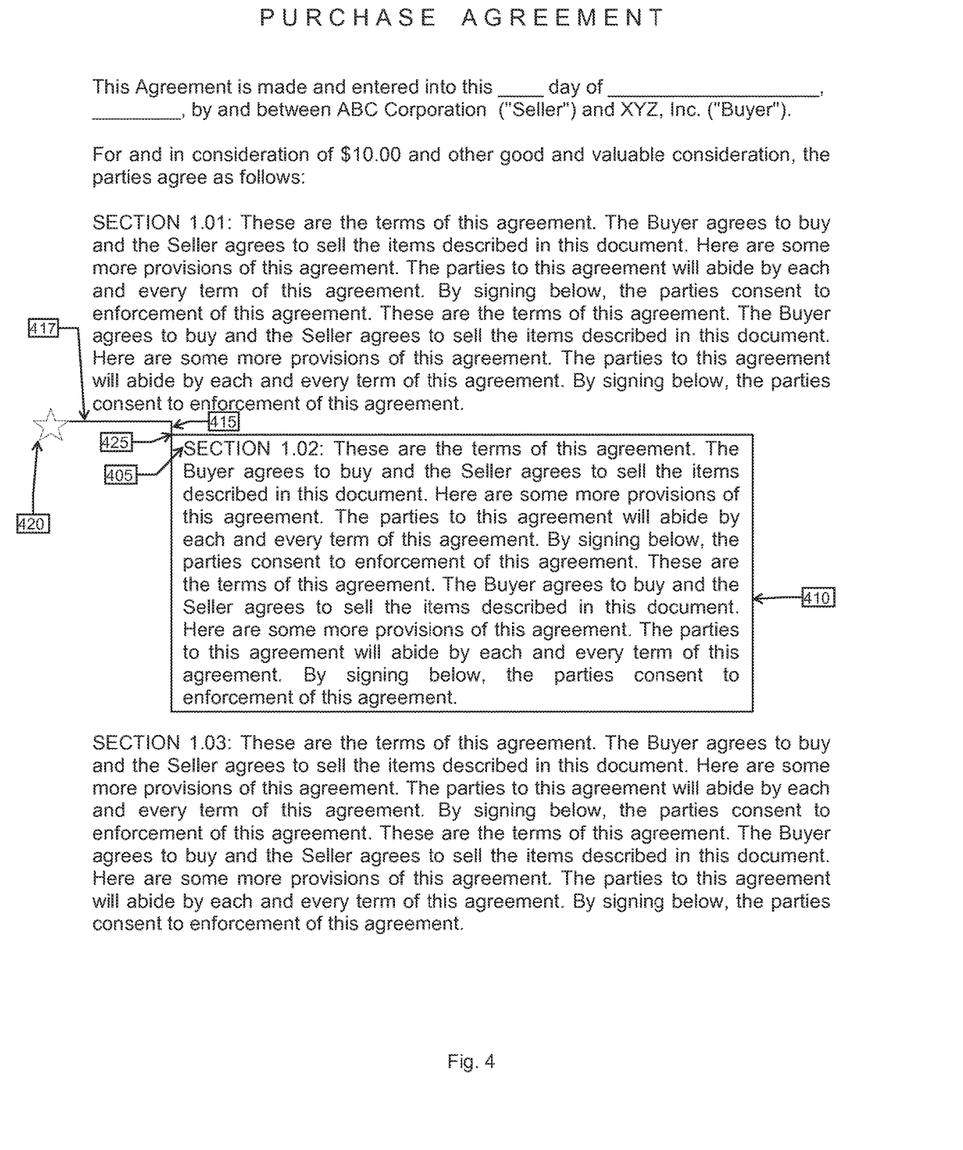
FIG. 4 demonstrates some aspects of markup discussed herein and illustrative possible visual outcomes of said markups such as reformatting the selected.
Figure 5:
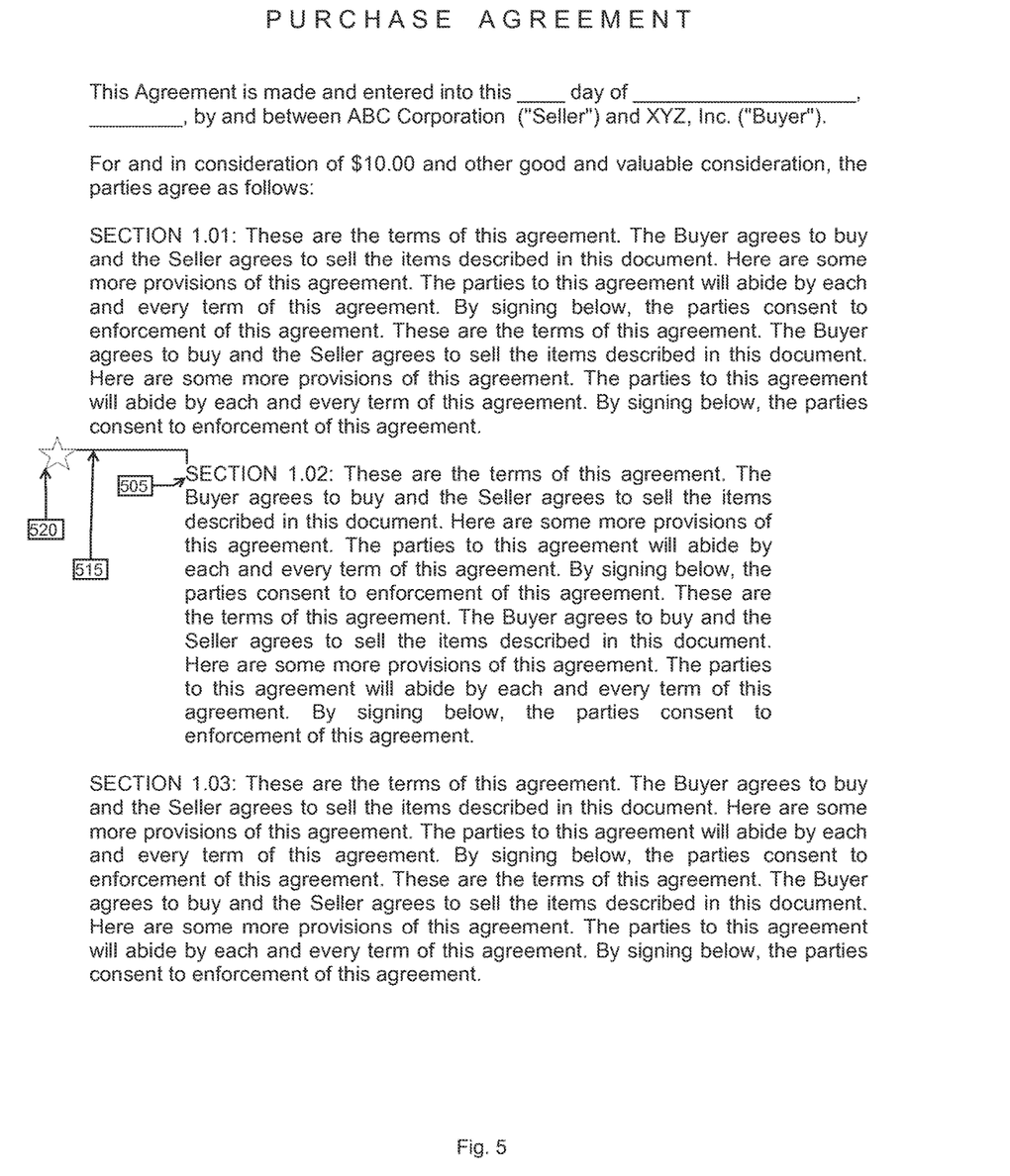
FIG. 5 demonstrates some aspects of markup discussed herein and illustrative possible visual outcomes of said markups such as further reformatting examples of the selected and marked-up text.
Figure 6:
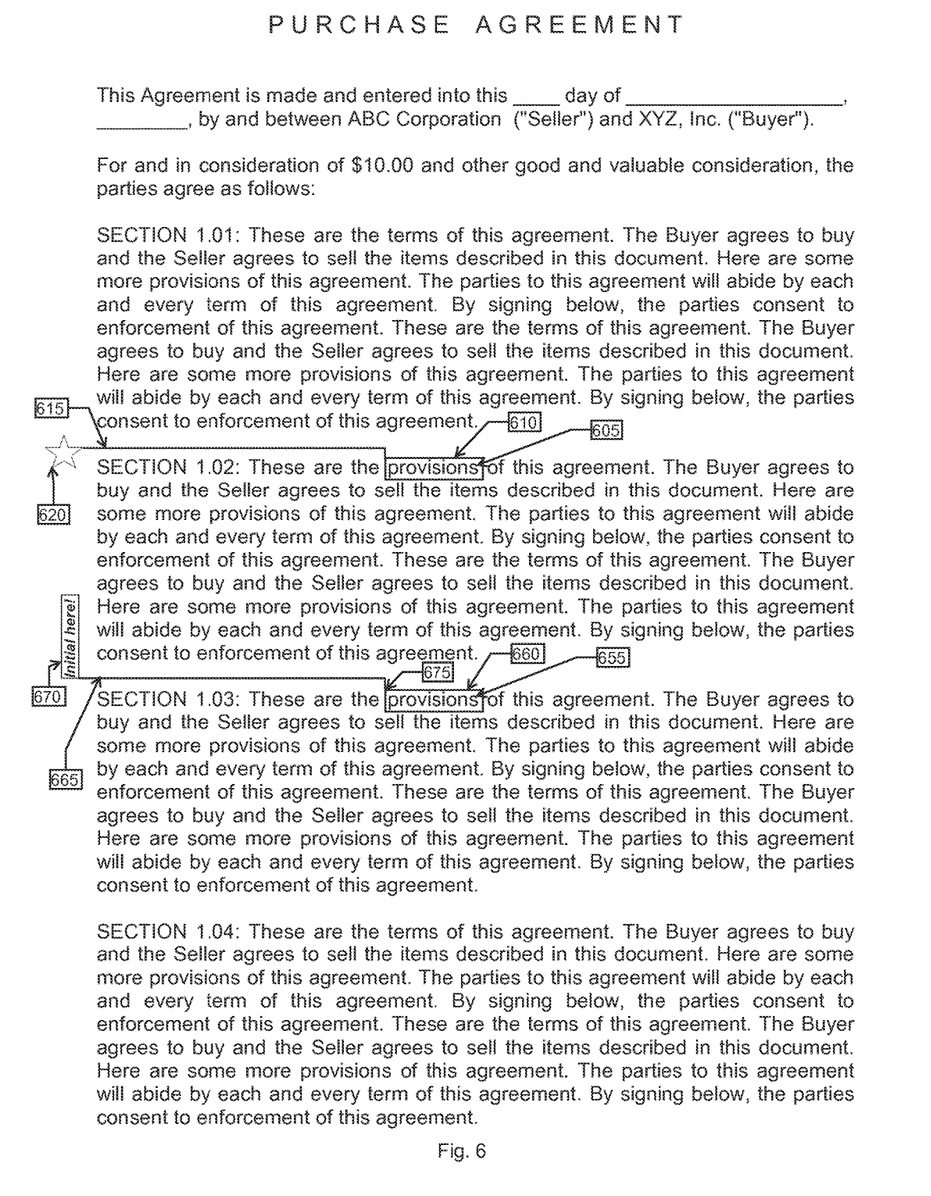
FIG. 6 demonstrates some further aspects of markup discussed herein and illustrative possible visual outcomes of said markups.

The internal logic to perform this operation is similar to the logic detailed in the previous application for Line Strikeout and Replace, except: instead of placing a reference graphic over the text that is to appear stricken, a strikethrough font attribute may be applied to the selected text (the selected text 110 is the word "items" in FIG. 1) and the connection graphic 115 connects to the strikethrough element 125 that results from adding the strikethrough font attribute to the selected text, and the connection graphic extends to the white space graphic 120. The white space graphic was placed in the left margin by default.

b) Section 1.03 of FIG. 1 reflects the same process as the description above for section 1.02 of FIG. 1, except that section 1.03 of FIG. 1 shows the result from the user selecting a location that covers many words over several lines of text. Instead of Adjacent Line Strikeout and Replace or Z-Style strikeout and replace, a strikethrough font attribute is illustrated as being applied to several lines and partial lines of text 130 at that location. A connection graphic 135 (connecting to the strikeout element 145 of the word "agreement") and white space graphic 140 are also illustrated. For the white space graphic 140 Section 1.03 of FIG. 1 reflects that the user has entered "deleted, not needed" instead of "property". In this case section 1.03 of FIG. 1 also reflects an instance in which the user has selected to perform an additional step of selecting the right margin for the white space graphic location.

c) Section 1.04 of FIG. 1 reflects a similar process as described above in section 1.02 of FIG. 1, except that section 1.04 of FIG. 1 depicts a result when a preference specifies that in addition to applying a strikethrough font attribute to the selected text 150 (the selected text is the word "described"), a reference graphic consisting of a border 155 should also to be generated over the selected text at the selected region. For the white space graphic 165, FIG. 1 illustrates an instance in which the user has entered the word "listed". In this instance, the use of a border reference graphic has resulted in the connection graphic 160 connecting to the border 165 instead of the strikethrough element of the selected text.

d) Section 1.05 of FIG. 1 also reflects a similar process as the description above for section 1.02 of FIG. 1, except that section 1.05 of FIG. 1 illustrates an outcome when a preference setting specifies that the font attributes of bold and italic should be applied to the selected text 170 at a user-defined change location (in this case the selected text happens to be the word "Buyer"), instead of a strikethrough font attribute being applied to the selected text. For the white space graphic 180 the user has entered "note: binding on buyer". In this case the user also performed an optional third step of choosing the right margin for the white space graphic location. The generated connection graphic 175 is then illustrated as being connected to the edge 185 of the selected text 170 (the selected text is the word "Buyer") and extending to the white space graphic 180.

e) Section 1.06 of FIG. 2 also reflects a similar process as the description above for section 1.02 of FIG. 1, except that section 1.06 of FIG. 2 shows a result when a preference setting specifies that the font attribute of bold should be applied to the text at the user-defined location (in this case the selected text 210 happens to be the words "By signing below"), instead of a strikethrough font attribute being applied to the selected text. For the white space graphic 220 the user has entered "Signature required!". In this case the user has also performed an optional additional step of setting a preference that allows the connection graphic 215 to cross over text and a further optional step of setting a preference that chose the color blue for the connection graphic color. The connection graphic 215 is illustrated as being connected to the edge 225 of the selected text and extending to the white space graphic 220. The connection graphic 215 is a straight line because a straight line happens to be the default graphic when, as in this case, the preference was to allow the connection graphic to cross text.

f) Section 1.01 of FIG. 3 reflects a similar process as the description above for section 1.02 of FIG. 1, except that section 1.01 of FIG. 3 illustrates a result when a preference specifies that a default white space non-text graphic 320 should be used for the white space element instead of a white space graphic containing user-inputted text. In this case only one user-input step was necessary, wherein the user dragged a mouse over the words "each and every" 310. The connection graphic 315, comprised of two perpendicular line segments, connects the white space element 320 to the strikeout element 325 of the words "each and every" 310. In this instance, defining the change location signified completion of the user-input. Since no text was entered, upon receiving the change location, a strikethrough font attribute was automatically applied to the selected text 310, a default white space non-text graphic 320 for the white space element was automatically generated, and the connection graphic 315 was also automatically generated.

g) Section 1.02 of FIG. 4 reflects a similar process as the description above for section 1.01 of FIG. 3, except that, instead of changing a font attribute of the selected text, the preference settings specified that the selected text 405 should instead be reformatted so that the selected text 405 is indented from both the right and left margins, and that a reference graphic comprised of a box 410 surrounding the reformatted selected text should be overlaid onto the document at the change location. Section 1.02 of FIG. 4 also shows a white space non-text graphic 420 and a connection graphic comprised of perpendicular line segments 415 and 417. The connection graphic connects to the upper left-hand corner 425 of the reference graphic. The modified change location contains the same text 405 that was in the change location prior to adding the marked changes and the modified change location also contains the added box 410 surrounding the text 405.

h) Section 1.02 of FIG. 5 reflects a similar process as the description above for section 1.02 of FIG. 4, except that, in this instance, the preferences do not specify that a reference is to be generated at the change location. In this case, an operation performed on the selected text 505 results in the selected text 505 being reformatted by indenting the selected text 505 from both sides as in Section 1.02 of FIG. 4. The white space non-text graphic 520 is then generated, and a connection graphic 515 is also generated connecting to a point on or near the selected text 505.

i) Section 1.02 of FIG. 6 reflects a similar process as the description above for section 1.01 of FIG. 3, except that, in this instance, instead of changing a font attribute of the selected text, the preference settings happen to specify that user-inputted text (the word "provisions" 605) should replace the selected text (the word "terms" 630 was the selected text, which originally appeared in the change location as can be seen in section 1.01 of FIG. 6) instead of including the user-inputted text in the white space element. The preferences further happen to specify that a box 610 should be overlaid onto the document so as to surround the user-inputted text. Section 1.02 of FIG. 6 also shows a white space non-text graphic 620 and a connection graphic 615. The connection graphic connects to the upper left-hand corner of the box 610. In this example, there were two items of user-input: i) selecting the text to be replaced (the word "terms"); and ii) entering the word "provisions". The modified change location contains the word "provisions" 605 and the box 610 surrounding "provisions".

j) Section 1.03 of FIG. 6 reflects a similar process as the description above for section 1.02 of FIG. 6, except that a third item of user-input happened to be used: entry of the words "Initial here!" for a white space graphic 670. This example also shows the connection graphic 665, the replacement word "provisions" 655 entered by the user, a box 660 surrounding the replacement word and the point 675 where the connection graphic meets the corner of the box 660.

k) Section 1.01 of FIG. 7 reflects a similar operation as detailed in application Ser. No. 12/424,005 for Line Strikeout and Replace, except that, in this instance, only one user-input step was necessary: defining the change location. Once the change location was defined, a reference graphic 710 was generated at the change location to indicate that the word "agreement" was stricken, a default white space non-text graphic 720 was generated in the left margin, and a connection graphic 715 was generated connecting the white space non-text graphic with a point 705 on the reference graphic.

FIG. 8, as previously discussed, provides an embodiment in which WSG boxes 803, 804 allow a user to specify a uniquely tailored WSG element for use in editing document 802. In box 803, the baseline WSG is determined either via user input, or by selecting a predetermined phrase or graphic for the baseline WSG from a dropdown box. Options box 804, on the other hand, allows the user to stylize the baseline WSG by offering options. Such illustrated options include a strike-through/strike-under radio button option, a WSG position (where does the WSG appear in document 802) drop down box 805 option, and a WSG font selector 806. The combination of selections in box 803 and box 804 may then result in a unique WSG to be used during markup of document 802. While a user may select their preferences and stick with them, some other users may become very adept at switching WSG fields and WSG options as they progress through document 802, creating a richly stylized markup in a very short amount of time. Because the methods described herein could be encapsulated in computer software, this makes it convenient to run off of a tablet or smartphone. In the case of the exampled real estate lease, a user could make decisions with a renter/buyer on the spot, with meaningful, unique WSG's to denote different thoughts on different areas of agreement or disagreement (e.g., this paragraph is "☺", while another paragraph is disagreed upon and thus labeled "To Be Determined". Finally, changes can be added/removed on the spot as negotiations progress prior to printing out the finished document.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the claimed invention. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. This application is intended to cover any adaptations or variations of the embodiment discussed herein. Therefore, it is manifested and intended that the claimed invention be limited only by the claims and the equivalents thereof.

What is claimed is:

1. A method of editing a digital document having an initial white space area, the method comprising the steps of:
    displaying the digital document in a display area of a GUI;
    receiving a first user input event comprising selecting a first portion of the digital document including at least one character of text;
    in response to the first user input event and without additional user input,
    modifying at least one of a font style, a font color, or a font size of the at least one character of text without additional user input;
    generating a white space element within a second portion of the digital document, the second portion being within the initial white space area of the digital document, without additional user input; and
    generating a connection graphic that connects the white space element and the text contained within the first portion without additional user input, wherein the initial white space area of the digital document is not increased.

2. The method of claim 1, the steps further comprising generating a reference graphic within the first portion without additional user input.

3. The method of claim 1, wherein the white space element and the connection graphic are overlaid on top of the digital document.

4. The method of claim 2, wherein the reference graphic is overlaid on top of the digital document.

5. The method of claim 1, wherein the connection graphic does not cross over any text.

6. The method of claim 2, wherein the connection graphic does not cross over any text.

7. The method of claim 1, wherein a font-attribute change is made to text that appears within the first portion.

8. The method of claim 1 wherein a strikethrough font attribute is applied to text contained within the first portion.

9. The method of claim 1, wherein a formatting change is made to text that appears within the first portion.

10. The method of claim 2, wherein a font-attribute change is made to text that appears within the first portion.

11. The method of claim 2 wherein a strikethrough font attribute is applied to text contained within the first portion.

12. The method of claim 2, wherein a formatting change is made to text that appears within the first portion.

13. The method of claim 2 wherein the reference graphic is a border surrounding the text contained within the first portion.

14. The method of claim 1 wherein the connection graphic extends from a portion of a character of text that is contained within the first portion to the white space element.

15. The method of claim 2 wherein the connection graphic extends from the reference graphic to the white space element.

16. The method of claim 1, wherein a new digital document comprising the digital document and any number of reference graphics, white space elements, connection graphics and font attribute changes may be further edited, saved, opened, closed, converted to a digital graphical image and/or printed.

17. The method of claim 2, wherein a new digital document comprising the digital document and any number of reference graphics, white space elements, connection graphics and font attribute changes may be further edited, saved, opened, closed, converted to a digital graphical image and/or printed.

18. The method of claim 1, wherein the second region is located within a margin of the digital document.

19. The method of claim 2, wherein the second region is located within a margin of the digital document.

20. The method of claim 1, wherein the connection graphic is comprised of one or more intersecting line segments.

21. The method of claim 2, wherein the connection graphic is comprised of one or more intersecting line segments.

22. A method of editing a digital document having an initial white space area, the method comprising the steps of:
    displaying the digital document in a display area of a GUI;
    receiving a first user input event comprising selecting a first portion of the digital document including at least one character of text;
    in response to the first user input event and without additional user input,
    modifying at least one of a font style, a font color, or a font size of the at least one character of text without additional user input;
    generating a reference graphic within the first portion without additional user input;
    generating a white space non-text graphic within a second portion of the digital document, the second portion being within the initial white space area of the digital document without additional user input; and generating a connection graphic that connects the white space non-text graphic and the reference graphic without additional user input, wherein the initial white space area is not increased.

23. The method of claim 22, wherein the reference graphic, the white space non-text graphic and the connection graphic are overlaid on top of the digital document.

24. The method of claim 22, wherein the connection graphic does not cross over any text.

25. A non-transitory computer readable medium storing instructions for causing a processor to edit a digital document having an initial white space area, the steps comprising:

displaying the digital document in a display area of a GUI;

receiving a first user input event comprising selecting a first portion of the digital document including at least one character of text;

in response to the first user input event and without additional user input, modifying at least one of a font style, a font color, or a font size of the at least one character of text without additional user input;

generating a white space element within a second portion of the digital document, the second portion being within the initial white space area of the digital document, without additional user input; and generating a connection graphic that connects the white space element and the text contained within the first portion without additional user input, wherein the initial white space area is not increased.

26. The non-transitory computer readable medium according to claim 25, the steps further comprising: generating a reference graphic within the first portion without additional user input.

27. The non-transitory computer readable medium according to claim 25, wherein the white space element and the connection graphic are overlaid on top of the digital document.

28. The non-transitory computer readable medium according to claim 26, wherein the reference graphic is overlaid on top of the digital document.

29. The non-transitory computer readable medium according to claim 25, wherein the connection graphic does not cross over any text.

30. The non-transitory computer readable medium according to claim 26, wherein the connection graphic does not cross over any text.

31. The non-transitory computer readable medium according to claim 25, wherein a font-attribute change is made to text that appears within the first portion.

32. The non-transitory computer readable medium according to claim 25, wherein a strikethrough font attribute is applied to text contained within the first portion.

33. The non-transitory computer readable medium according to claim 25, wherein a formatting change is made to text that appears within the first portion.

34. The non-transitory computer readable medium according to claim 26, wherein a font-attribute change is made to text that appears within the first portion.

35. The non-transitory computer readable medium according to claim 26, wherein a strikethrough font attribute is applied to text contained within the first region.

36. The non-transitory computer readable medium according to claim 26, wherein a formatting change is made to text that appears within the first portion.

37. The non-transitory computer readable medium according to claim 26, wherein the reference graphic is a border surrounding the text contained within the first portion.

38. The non-transitory computer readable medium according to claim 25, wherein the connection graphic extends from a portion of a character of text that is contained within the first portion to the white space element.

39. The non-transitory computer readable medium according to claim 26, wherein the connection graphic extends from the reference graphic to the white space element.

40. The non-transitory computer readable medium according to claim 25, wherein a new digital document comprising the digital document and any number of reference graphics, white space elements, connection graphics and font attribute changes may be further edited, saved, opened, closed, converted to a digital graphical image and/or printed.

41. The non-transitory computer readable medium according to claim 26, wherein a new digital document comprising the digital document and any number of reference graphics, white space elements, connection graphics and font attribute changes may be further edited, saved, opened, closed, converted to a digital graphical image and/or printed.

42. The non-transitory computer readable medium according to claim 25, wherein the second portion is located within a margin of the digital document.

43. The non-transitory computer readable medium according to claim 26, wherein the second portion is located within a margin of the digital document.

44. The non-transitory computer readable medium according to claim 25, wherein the connection graphic is comprised of one or more intersecting line segments.

45. The non-transitory computer readable medium according to claim 26, wherein the connection graphic is comprised of one or more intersecting line segments.

46. A method of editing a digital document, having an initial white space area, the method comprising the steps of:

displaying the digital document in a display area of a GUI;

receiving a first user input event comprising selecting a first portion of the digital document including at least one character of text;

in response to the first user input event and without additional user input, modifying at least one of a font style, a font color, or a font size of the at least one character of text without additional user input;

generating a reference graphic within the first portion without additional user input;

generating a white space non-text graphic within a second portion of the digital document without additional user input, the second portion being within the initial white space area of the digital document; and generating a connection graphic that connects the white space non-text graphic and the reference graphic without additional user input, wherein the initial white space area is not increased.

47. The method of claim 46, wherein the reference graphic, the white space non-text graphic and the connection graphic are overlaid on top of the digital document.

48. The method of claim 46, wherein the connection graphic does not cross over any text.

* * * * *